Aug. 4, 1942.  H. O. DROTNING ET AL  2,292,217
FINDER HOOD CONSTRUCTION
Filed Feb. 17, 1940   2 Sheets-Sheet 1

HENRY O. DROTNING
HOWARD G. FAY
INVENTORS

BY

ATTORNEYS

Aug. 4, 1942.　　H. O. DROTNING ET AL　　2,292,217
FINDER HOOD CONSTRUCTION
Filed Feb. 17, 1940　　2 Sheets-Sheet 2
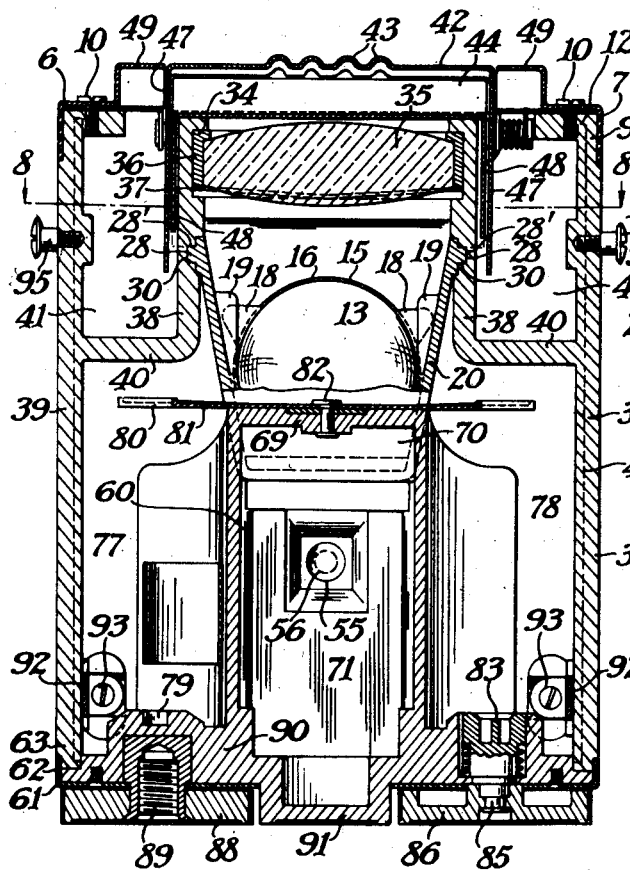
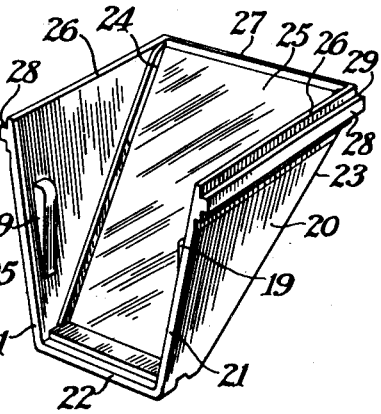
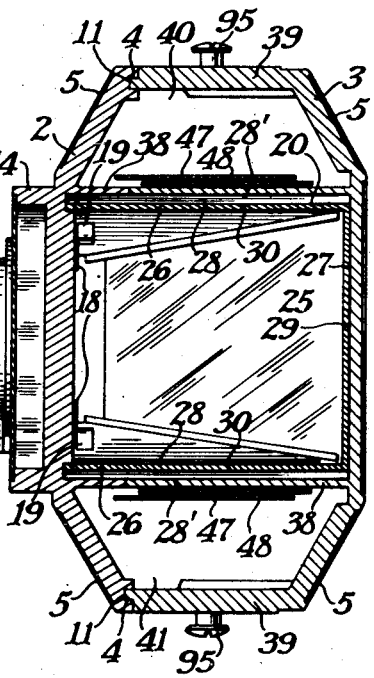
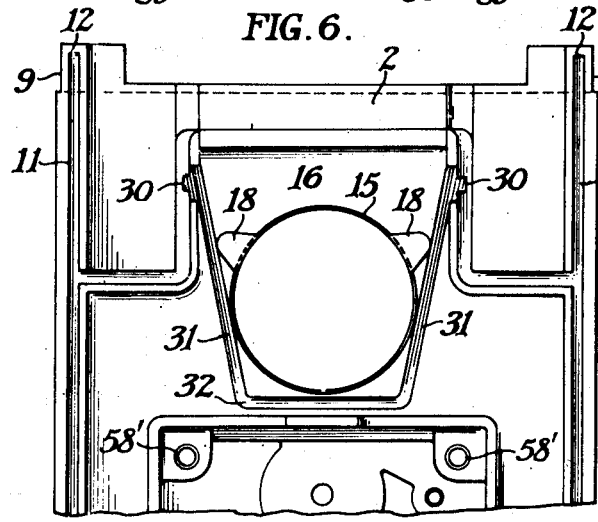
HENRY O. DROTNING
HOWARD G. FAY
INVENTORS
BY
ATTORNEYS Patented Aug. 4, 1942

2,292,217

UNITED STATES PATENT OFFICE 2,292,217

FINDER HOOD CONSTRUCTION

Henry O. Drotning and Howard G. Fay, Rochester, N. Y., assignors to Eastman Kodak Company, Rochester, N. Y., a corporation of New Jersey Application February 17, 1940, Serial No. 319,553

4 Claims. (Cl. 95—31)

This invention relates to photography and more particularly to cameras having built-in view finders.

One object of our invention is to provide a camera with a built-in view finder of large size, preferably as large as the exposure area. Another object of our invention is to provide a camera with a foldable finder hood adapted to surround the viewing lens of the finder when in an open position and to provide pockets into which portions of the hood members may fold when the hood is folded flat against the top of the camera. Another object of our invention is to provide a camera with a view finder mounted as close as possible to the camera objective, and other objects will appear from the following specification, the novel features being particularly pointed out in the claims at the end thereof.

Coming now to the drawings, in which like reference characters denote like parts throughout:

Fig. 5 is a section taken on line 5—5 of Fig. 2.

Fig. 6 is a fragmentary rear elevation of a portion of the front camera section wall 2.

Fig. 7 is a perspective view of the mirror element holding frame removed from the camera.

Fig. 8 is a section on line 8—8 of Figs. 2 and 5.

Figure 1:
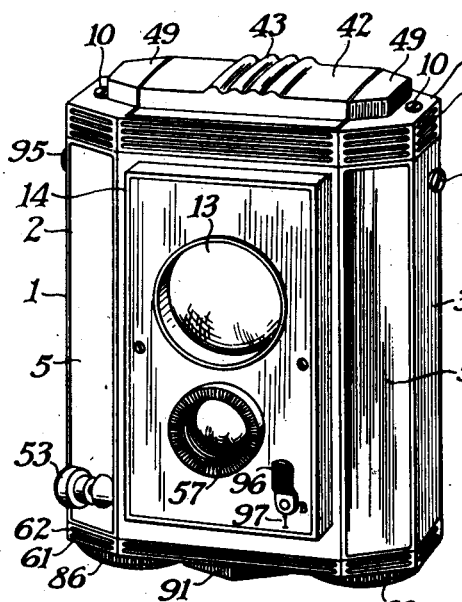
Fig. 1 is a perspective view of a typical camera constructed in accordance with and embodying a preferred form of our invention.
Figure 3:
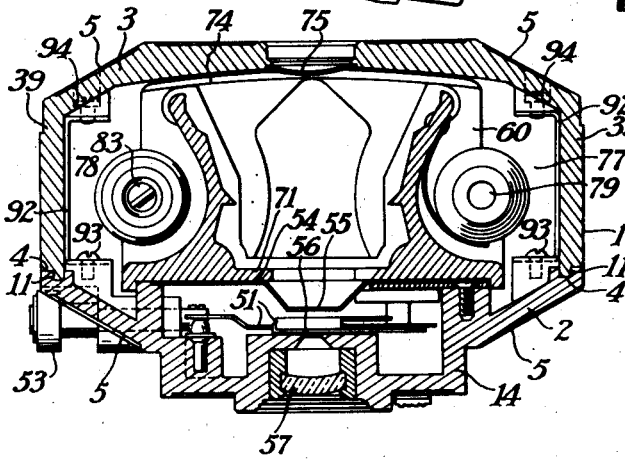
Fig. 3 is a section on line 3—3 of Fig. 2.

Referring to Fig. 1, which shows a preferred embodiment of our invention, the camera may consist broadly of a camera body 1, which, as shown in Fig. 3, may consist of a front body portion 2 and a rear body portion 3, which are joined together by the tongue and groove connections at 4. These two camera body sections form, in effect, a rectangular tubular member, open at the top and bottom and, in the embodiment illustrated, having the corners removed to form angular spaced decorative walls 5.

Figure 2:
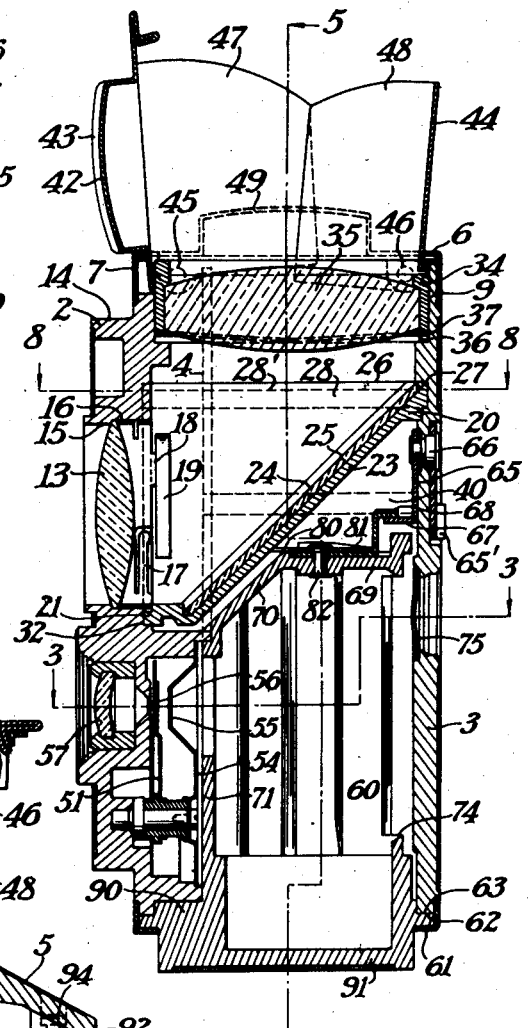
Fig. 2 is an enlarged sectional view on a plane taken parallel to the axes of the two lenses of the camera shown in Fig. 1.

The top of the body sections consists of a cap member 6, having a downwardly extending flange 7, which, at best shown in Fig. 2, engages an upwardly extending flange 9 on the camera wall sections. Thus, this cap member, which may be held in place by the screws 10, shown in Fig. 5, holds the body sections 1 and 2 tightly together with their tongue and groove surfaces 4 in contact.

As indicated in Fig. 6, the camera body section 2 is provided with the grooved walls 11, which form portions of the tongue and groove connections 4, these grooves terminating at 12 above the flanged areas 9 which support the top cap member 6. Since the tongues on the complementary shaped parts of the body section 1 fit into these grooves 11, they limit longitudinal movement of one section relative to the other, while the parts are being assembled. A similar construction is used at the lower ends of the grooves 11, not shown.

The upper part of the camera body supports a large size view finder—preferably one which will show a full size image. This finder comprises a front objective 13, preferably mounted in a forwardly extending, but shallow housing 14, carried by the camera body section 2. As indicated in Fig. 2, the objective 13 fits into a rabbet 15 in the molded housing, and is held in place by an annular ring 16, having a pair of spring fingers 17 and including a pair of outwardly flared lugs 18, best shown in Fig. 6. These lugs are positioned to lie opposite a pair of lugs 19, carried by the finder element holding frame 20, best shown in Fig. 7, for purposes to be later described.

As indicated in Figs. 2 and 7, the finder element holder 20 consists of a small housing, having front edge walls 21, a bottom edge wall 22, and a slanting back wall 23, which supports, in side grooves 24, a mirror 25. The frame also includes side top walls 26 and a rear top wall 27, about which flanges 28 and 29 extend. This holding frame may be readily assembled by sliding the flange sections into corresponding grooves 30, in the camera body sections, and there is also on the front body section 2, a pair of grooves 31, connected by a cross-groove 32, which will receive the edges 21 and 22 of the finder holding bracket. Thus, when the finder holding bracket 20 is slid into place and the camera sections 1 and 2 are placed together, the finder element holding frame 20 is not only fixedly held in place, but, through the action of the lugs 19 and the lugs 18 of the spring ring 16, the front finder lens 13 is definitely positioned into place.

The finder also includes an upper finder element holding frame 34, which is substantially square and which carries the viewing lens 35. This frame 34 is slidably mounted in the groove 36 in the camera body sections, as best shown in Fig. 5, and there is a spring washer 37, as indicated in Fig. 2, to hold the viewing lens 35 in its proper position when the camera front and back body sections are assembled.

As shown in Fig. 5, the camera body is provided with a pair of spaced, parallel walls 38 which are substantially parallel to the side walls 39 of the camera body and which have supporting grooves for not only the viewing lens 35, mounted in its frame 34, but they are also provided with grooves 28' which receive the complementary shaped flanges 28 of the view finder element holding frame 20. These walls are connected with transverse walls 40 which extend outwardly to the end walls 39 and which form substantially light-tight pockets 41 to either side of the view finder to form spaces into which portions of the hood members may slide when in the folded position shown in Fig. 5.

As above explained, the cap member 6 supports a hood. This hood may consist of a hinged cover member 42 which we prefer to provide of metal formed with suitable decorative embossings 43. The hood consists of two sections, the hood member 42 and the hood member 44, the former being pivoted at 45 to the cap member 6 and the latter being pivoted at 46 to the cap member.

The hood members are alike except for their shape and dimensions, in that the hood member 42 is provided with a pair of side wings 47 and the hood member 44 is provided with a pair of side wings 48. Thus, when the hood is in a raised or operative position, as shown in Fig. 2, it extends completely around the viewing lens 35 and shades it from light. However, when the parts are to be folded into the Fig. 1 position, the hood member 44 and the hood member 42 are turned about their pivots into the folded position shown in Fig. 4 and in Fig. 5, and in the latter figure, the side wings 47 and 48 are shown as passing down into the substantially light-tight pockets 41. The top cap is also provided with a pair of decorative end formings 49 to each side of the hood.

Figure 4:
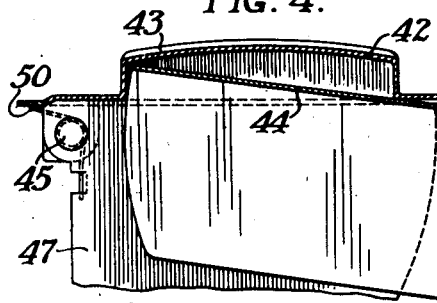
Fig. 4 is an enlarged fragmentary section showing a portion of the hood construction.

We also provide spring members 50 about the hinges 45 and 46, one of which is shown in Fig. 4, so that when the upper hood member 43 is drawn out, both hood members will spring into their operative or raised position.

The box-like front extension 14 on the camera body section 2 is adapted to enclose a shutter, shown broadly as 51 in Fig. 3. This shutter may be of the type shown in a copending application, Serial No. 255,914, Drotning, filed Feb. 11, 1939, so that the structure need not be fully described herein, except to point out that the shutter blade 52 may be operated by a trigger member 53 on the outside of the wall section 2 and that the blade and other shutter mechanism are held in place by a cover plate 54, which is provided with an aperture 55, registering with the aperture 56, which lies directly behind the camera objective 57. The shutter forms no part of the present invention and need not be further described. The cover plate 54, is, however, held on by screws 58 passing into correspondingly threaded apertures 58', shown in Fig. 6.

In the lower part of the tubular camera body formed by the sections 1 and 2, a roll holder, designated broadly as 60, is mounted, this roll holder being carried by a bottom cap member 61, having upstanding flanges 62 about its periphery to engage a rabbet 63 extending around the camera body section members. This cap is removably held in place by the latch member 65, carried by the pivot 66 and having a latch element 67 engageable under the latch element 68, carried by a top wall 69, adjacent a slanting wall 70 directed downwardly to the front wall 71 of the roll holder. A handle 65' may be used to turn the pivot 66.

When the roll holder, which includes a cap, is inserted into the camera body, it may be held in place by the latch 67—68.

The roll holder is provided with an exposure frame 74, behind which there is the usual non-actinic red or green window 75 for viewing the exposure numbers on the film backing paper. Film may be drawn from a supply film spool, located in a spool chamber 77, to a spool located in a take-up spool chamber 78.

A spool is held in chamber 77 by having the trunnion of the spool engage the socket 79 at its lower end, and the spool holding bracket notch 80 at its upper end. The walls forming the upper spool support 80 are carried by a spring arm 81, riveted at 82 to the roll holder wall 69. A similar trunnion holder 83 is arranged in the spool chamber 78 above a winding flange 84, carried by a shaft 85 and terminating in the winding knob 86 on the bottom of the camera, as best shown in Fig. 5. A known type of one-way clutch in the form of a coiled spring is used, so that the knob 86 may only be turned in a direction to wind film thereon.

In order to make the bottom of the camera uniform, we prefer to provide a dummy knob 88, which is fastened on by means of a tripod socket member 89, which is carried by a portion of the bottom wall 90 of the roll holder. The center portion of the bottom 91 is formed as a decorative member to make the camera appear symmetrical.

Since the bottom cap member 62, carrying the roll holder, is removably secured to the camera, we prefer to provide additional means at the bottom for holding the body sections 1 and 2 together. Such means consist of a pair of metal brackets 92 inside the edge walls 39 and formed over at each end, so that screws 93 may attach these brackets to the front wall section 2 and screws 94 may attach these brackets to the rear wall sections. It is only necessary to provide these screws at the bottom of the camera casing, because the upper cap member 7 is not removable and forms the means for holding the camera sections together at the top.

We also may provide studs 95 on each side of the camera near the top for a carrying handle or strap, and we prefer to provide a lever 96 which may be moved over a scale 97 to indicate the type of exposure for which the camera is set.

While the camera construction described above sounds comparatively complicated, and the parts appear to be rather intricate in design, it must be remembered that this camera is particularly designed to be made of molded material, and it is further particularly designed so that the molded parts may be rapidly assembled by unskilled labor.

In assembling our camera, an operator may pick up the camera section 1 and rapidly slide into place the upper viewing lens holding frame 36 with the lens 35 in place and the lower view finder element holding frame 20 with the mirror 25 in place, after having first preferably assembled the latch element 65 in place by its stud 66.

The front camera section 2 then has the shutter 51 assembled in the forwardly extending housing 14 and the front finder lens 13 is dropped against its receiving rabbet 15, the spring ring 16 being snapped into place. The operator then engages the interengaging flange and grooves designated broadly as 4, thus locating the body members 1 and 2 relative to each other, and thus holding the finder element frames in place, as well as the front finder lens 13 through the engagement of lugs 18 and 19.

The upper cap 6 has previously been assembled with the hood members 47 and 48 and this cap can be rapidly positioned by sliding the flanges 7 over the interengaging flanges 8 and by attaching the cap member by the two screws 10. The brackets 92 have been previously assembled to the section 2, and by placing the two screws 94 in place, the bottom of the camera body is assembled.

The roll holder is a single molded part mounted on the lower cap member 62, so that the camera is completed by merely moving the roll holder up through the open bottom of the camera body where it can be held in place by engaging the latch elements 67 and 68.

It will be noted that the assembling operations are extremely simple and they can be performed quickly by relatively unskilled help. The many interengaging flanges 4, 11, 31, 36, 21, 26, 29, 34, 7, 8, 61 and 62 all form light-tight joints, and, in addition, render the camera parts interfitting to such an extent that the parts can be properly and quickly brought together in assembling the camera.

By providing the inside walls 38 with their outside extensions 40 to form substantially light-tight pockets 41, and by the flanged construction of the finder element frames, it is impossible for light to pass down through the finder into that portion of the camera occupied by the roll holder. The pockets 41 also provide spaces into which the side wings 47 and 48 of the hood members 42 and 44 may fold, and they also, through the walls 40, form upper walls for the film spool chambers 77 and 78.

We claim:

1. A camera of the twin lens type including a camera body having outside walls including a front wall, a camera objective and a finder lens carried by the front wall, a roll holder including an exposure frame axially aligned with respect to the camera objective, spool holders carried on each side of the exposure frame, a pair of spaced parallel walls above the roll holder of substantially the width of the exposure frame inside the camera body, a view finder including a finder element housing located between said parallel walls, light tight connections between the parallel walls above the spool holders extending to the camera body outside walls and light-tight connections between the finder element housing and the spaced parallel walls above the roll holder and the front outside wall of the camera body, a cap, on the top of the camera body including a window through which the finder may be viewed, and a hood member for the finder hinged to the cap and having side flanges positioning to swing down parallel to the spaced parallel walls above the roll holder and past the sides of the view finder when the hood is moved to an inoperative or folded position.

2. In a camera, the combination with a camera body including front, back and side walls constituting a polygonal tubular body, a bottom cap including a roll holder insertable into the bottom of the camera, a top cap including a window, a finder located in the upper part of the camera body beneath the window, walls inside of the camera body on each side of the finder and extending above the roll holder from the finder to the side walls of the camera constituting substantially light tight pockets, a hinged hood member including side flaps movable to cover and uncover the finder window, said flaps being movable into the substantially light tight pockets when said hood member is folded to cover the view finder.

3. In a camera, the combination with a camera body including front, back and side walls constituting a polygonal tubular body, a bottom cap including a roll holder insertable into the bottom of the camera, a top cap including a window, a finder located in the upper part of the camera body beneath the window, walls inside of the camera body on each side of the finder and extending above the roll holder from the finder to the side walls of the camera constituting substantially light tight pockets, a pair of hood members hinged on opposite sides of the finder to the camera, side flaps carried by the hood members and positioned to move into the substantially light tight pockets on the sides of the finder when the hinged hood members are moved to cover the finder.

4. In a camera, the combination with a camera body including front, back and side walls constituting a polygonal tubular body, a bottom cap including a roll holder insertable into the bottom of the camera, a top cap on the camera body, a window in the top cap, parallel walls inside of the camera body extending downwardly toward the roll holder and outwardly toward the side walls of the camera to form a pair of pockets, finder elements located between the parallel walls, a finder objective carried by the front wall of the camera, and a foldable hood carried by the top cap and movable at least partially into the pockets when said hood is moved to a folded position to cover the view finder.

HENRY O. DROTNING.
HOWARD G. FAY.